(12) United States Patent
Lim et al.

(10) Patent No.: US 7,841,867 B2
(45) Date of Patent: Nov. 30, 2010

(54) HARD DISK DRIVE APPARATUS

(75) Inventors: Hong Taek Lim, Suwon-si (KR); Ki Tag Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/353,416

(22) Filed: Jan. 14, 2009

(65) Prior Publication Data

US 2009/0181569 A1 Jul. 16, 2009

(30) Foreign Application Priority Data

Jan. 14, 2008 (KR) ................. 10-2008-0003788

(51) Int. Cl.
*H01R 12/00* (2006.01)
*H05K 1/00* (2006.01)
(52) U.S. Cl. ...................... 439/67; 439/329
(58) Field of Classification Search .......... 439/83, 439/329, 67, 493, 495, 545
See application file for complete search history.

(56) References Cited

U.S. PATENT DOCUMENTS 4,477,137 A * 10/1984 Ayer .................... 439/590

FOREIGN PATENT DOCUMENTS

| JP | 2000299153 | 10/2000 |
| JP | 2006147294 | 6/2006 |
| KR | 20060053465 | 5/2006 |

\* cited by examiner

*Primary Examiner*—Javaid Nasri
(74) *Attorney, Agent, or Firm*—Stanzione & Kim, LLP

(57) ABSTRACT

A hard disk drive (HDD) apparatus includes a connector combined with a side of a printed circuit board (PCB) and with a connection terminal of a flexible printed cable (FPC), a flip pivotably combined with the connector to lock the connection terminal into and unlock the connection terminal from the connector, and an area increasing and strength reinforcing portion formed at the flip to increase a handling area of the flip and reinforce strength of the flip.

15 Claims, 8 Drawing Sheets

HARD DISK DRIVE APPARATUS

CROSS-REFERENCE TO RELATED APPLICATIONS

This application claims the priority under 35 U.S.C. §119(a) from Korean Patent Application No. 10-2008-0003788, filed on Jan. 14, 2008, in the Korean Intellectual Property Office, the disclosure of which is incorporated herein by reference.

BACKGROUND OF THE INVENTION

1. Field of the Invention

The present general inventive concept relates to a hard disk drive (HDD) apparatus, and more particularly, to an HDD apparatus to increase convenience of pivoting operations of a flip for locking and unlocking operations to improve the pivoting operations of the flip and to provide mechanical strength to the flip such that the flip endures an external force exerted thereto to be prevented from being easily broken down.

2. Description of the Related Art

Hard disk drives (HDD) record data on and/or reproduce data from disks using read/write heads. Thus, since the HDDs are capable of access mass data at high speeds, the HDDs are widely used as secondary memory units, etc. of computer systems.

When such HDDs are installed in various types of electronic products, the HDDs are connected to flexible printed cables (FPCs), which extend from main boards of the electronic products, in order to transmit data recorded on disks.

In more detail, connection terminals, which are installed at ends of the FPCs, are inserted into connectors provided on sides of printed circuit board assemblies (PCBAs) of the HDDs so as to install the HDD in the electronic products.

As described above, the connectors are combined with the connection terminals of the FPCs to form spaces in which the HDDs are connected to main boards of the electronic products.

If connection of the connectors is not properly performed, the HDDs do not smoothly access data, lowering the reliability. As a result, performances of the HDDs are deteriorated.

The connectors include manual or mechanical actuators, which are called flips, so as to improve their performances. Such a flip generally has a slim bar shape and pivots on a pivot shaft provided at both ends of the flip at a predetermined angle.

A flip operates to lock a connection terminal of a FPC into and unlock the connection terminal from a connector. In other words, when the flip is bent to be perpendicular to an upper surface of the connector, the connection terminal of the FPC is inserted into the connector. Next, the flip pivots parallel with the upper surface of the connector to lock the connection terminal into the connector. Here, locking refers to simple mechanical fixation of the connection terminal to the connector and electrical connection of the connection terminal to the connector to transmit data.

Conventionally, 2.5-inch or 3.5-inch middle-sized or large-sized HDDs are used.

A size of a flip is proportional to a size of a HDD. Thus, a flip of a middle-sized/large sized HDD has an enough size to be pivoted by fingers of a worker, i.e., to be handled by the worker. A connecting structure of a connection terminal of the middle-sized/large-sized HDD may be different from a connecting structure of a connection terminal of a small-sized HDD.

Since the flip of the middle-sized/large-sized HDD has the enough size and enough strength, it is not difficult to manually or mechanically pivot the flip. Also, the flip is hardly mechanically broken down during the pivoting operation of the flip.

Since recently developed HDDs realize high Track Per Inch (TPI) and high Bits Per Inch (BPI), they realize high capacity, have small sizes, and expand their applications. Small form factor HDDs (SFF HDDs) having 0.85-inch sizes, i.e., sizes similar to coins of 100 won, is prearranged be developed to be used in portable phones, etc.

Sizes of connectors of FPCs of HDDs and sizes of flips attached to the connectors have been reduced with gradual reductions in sizes of the HDDs.

A length of a flip of a connector of a 1.8-inch HDD is within a range between 10 mm and 20 mm, a width of the flip is 2 mm or less, and a thickness of the flip is tens of millimeters or less. Since a size of a flip of a small-sized HDD is reduced in a small-sized HDD as described above, it is difficult to directly handle the flip. Thus, the flip must be carefully pivoted.

However, in the case of such a small-sized HDD, it is not easy for a worker to handle a flip because of a very small absolute size of the flip in spite of the careful manipulation of the worker. In addition, since the flip has a weak structure, the flip is easily broken down or damaged by an external weak force applied to pivot the flip.

An absolute thickness of a flip having an approximately rectangular shape is reduced with a reduction in a size of a HDD. Thus, the flip does not sufficiently endure an applied force. Also, a width of the flip is smaller than a length of the flip.

Accordingly, an absolute size of a flip may not be unlimitedly increased in consideration of a small size of a HDD. However, a structure of the flip is required to be improved to increase the convenience of a pivoting operation of the flip for locking and unlocking so as to improve a handling work of the flip. Also, the flip is given mechanical strength to sufficiently endure an applied external force so as to be prevented from being easily broken down.

SUMMARY OF THE INVENTION

The present general inventive concept provides a hard disk drive (HDD) apparatus to increase convenience of a pivoting operation of a flip for locking and unlocking, to improve a handling work of the flip, and to provide mechanical strength to the flip so that the flip sufficiently endures an applied external force to prevent the flip from being easily broken down.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a hard disk driving apparatus including a connector combined with a side of a printed circuit board (PCB) and with a connection terminal of a flexible printed cable (FPC), a flip pivotably combined with the connector to lock the connection terminal into and unlock the connection terminal from the connector, and an area increasing and strength reinforcing portion formed at the flip to increase a handling area of the flip and reinforce strength of the flip.

The area increasing and strength reinforcing portion may be formed at an exposed end of the flip.

The area increasing and strength reinforcing portion and the flip may form a single body using a single material.

The flip may have a rectangular shape so that a length is longer than a width, and the area increasing and strength reinforcing portion may have a width which is gradually increased from both ends toward a central area.

The area increasing and strength reinforcing portion may have an arc shape.

The connector may include a plurality of sockets including terminal insertion portions into which the connection terminal is inserted, and the sockets may be formed at a side of the connector; and a locker connected to the flip and operating when the flip pivots, to lock the connection terminal, which is inserted into the terminal insertion portions, into the sockets.

The connector may further include a plurality of terminals which electrically connect the plurality of sockets to the PCB.

The plurality of terminals may be soldered onto the PCB.

The plurality of sockets may include lower plates electrically connected to the terminals, upper plates keeping predetermined distances above the lower plates to be parallel with the lower plates, and barrier plates perpendicular to the lower and upper plates between the lower and upper plates to divide areas between the lower and upper plates into first and second spaces.

The first spaces may be adjacent to the PCB and house the locker, and the second spaces may be the terminal insertion portions.

The locker housed in the first spaces may be a rotating cam which rotates when the flip pivots together with the upper plates, to elastically deform the upper plates so that the upper plates slant so as to clamp the connection terminal, which is inserted into the terminal insertion portions, by the lower and upper plates.

The connector may further include a socket housing which is partially combined with the PCB and encloses and supports the plurality of sockets.

The socket housing may further include a pair of pivot supporting brackets which are formed just next to both ends of the flip to support the flip so that the flip pivots.

The PCB may further include a spacer which is adjacent to the connector to allow the flip to pivot.

A side of the PCB may be cut to form the spacer.

An outer line of the cut side of the PCB may have a shape corresponding to an outer line of the area increasing and strength reinforcing portion.

The HDD may be a small form factor HDD (SFF HDD) having a diameter of 1.8 inch or less.

The foregoing and/or other aspects and utilities of the present general inventive concept may also be achieved by providing an apparatus including a processing unit to process data, and a hard disk drive apparatus including a connector combined with a side of a printed circuit board (PCB) and with a connection terminal of a flexible printed cable (FPC) connectable to the processing unit, a flip pivotably combined with the connector to lock the connection terminal into and unlock the connection terminal from the connector, and an area increasing and strength reinforcing portion formed at the flip to increase a handling area of the flip and reinforce strength of the flip.

The foregoing and/or other aspects and utilities of the present general inventive concept may also be achieved by providing a hard disk drive apparatus including a connector combined with a side of a printed circuit board (PCB) and with a connection terminal of a flexible printed cable (FPC) connectable to the processing unit, a flip pivotably combined with the connector to lock the connection terminal into and unlock the connection terminal from the connector, and a portion formed on the flip and having a variable length, a variable width, and a variable thickness.

The foregoing and/or other aspects and utilities of the present general inventive concept may also be achieved by providing. An apparatus including a processing unit to process data, and a hard disk drive apparatus including a connector combined with a side of a printed circuit board (PCB) and with a connection terminal of a flexible printed cable (FPC) connectable to the processing unit, a flip pivotably combined with the connector to lock the connection terminal into and unlock the connection terminal from the connector, and a portion formed on the flip and having a variable length, a variable width, and a variable thickness.

BRIEF DESCRIPTION OF THE DRAWINGS

The above and/or other aspects and advantages of the present general inventive concept will become apparent and more readily appreciated from the following detailed description, taken in conjunction with the accompanying drawings of which.

DETAILED DESCRIPTION OF THE PREFERRED EMBODIMENTS

The attached drawings for illustrating preferred embodiments of the present general inventive concept are referred to in order to gain a sufficient understanding of the present general inventive concept, the merits thereof, and the objectives accomplished by the implementation of the present general inventive concept.

Figure 1:
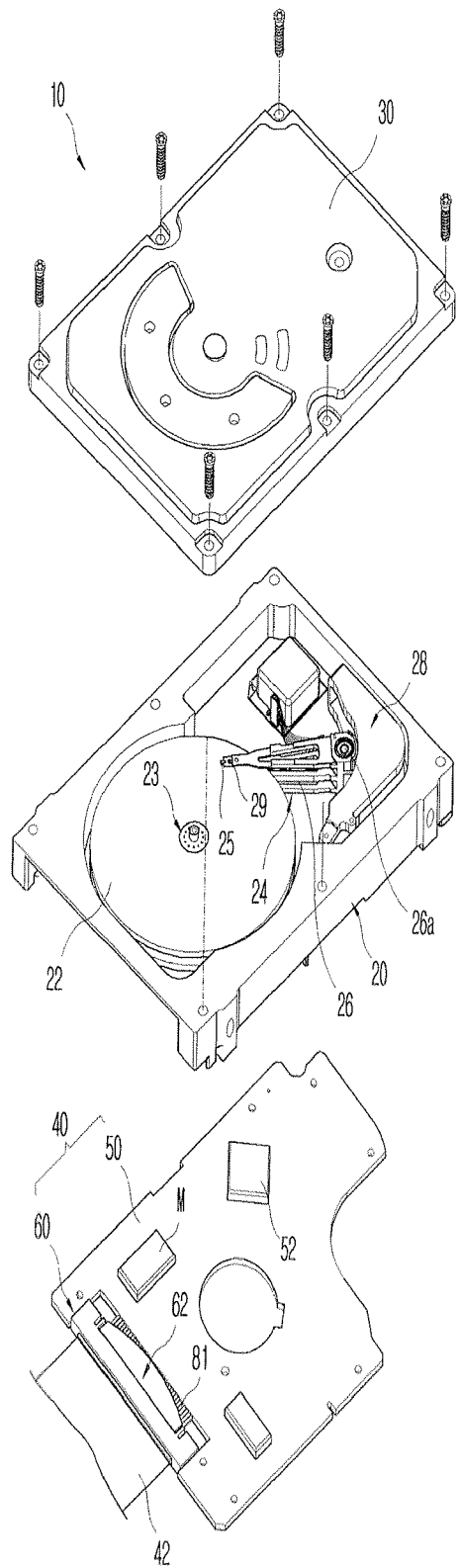
FIG. 1 is a partial exploded perspective view illustrating a hard disk drive (HDD) apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures FIG. 1 is a partial exploded perspective view illustrating a hard disk drive (HDD) apparatus according to an embodiment of the present general inventive concept. Referring to FIG. 1, the HDD apparatus 10 of the present embodiment includes a base 20, a cover 30 which is combined with an upper surface of the base 20, and a printed circuit board assembly (PCBA) 40 which is combined with a lower portion of the base 20. The HDD apparatus may be used as a memory device to be connected to a processing unit of an apparatus connectable to the memory device, to store data and to output the data to the apparatus.

A plurality of parts (not illustrated), which are related to reading and writing of information, are embedded in the base 20. In other words, the base 20 includes one or more disks 22 on which data is recorded and stored, a spindle motor 23 which is provided in a central area of the disk 22 to rotate the disk 22, a head stack assembly (HSA) 24 which relatively moves toward the disk 22, etc.

The base 20 is classified into a flat type which has a flat upper surface to lift and assemble embedded parts and a bowl type which embedded parts are housed and assembled. In the case of the present embodiment, the base 20 is the bowl type but is not limited to this type. Thus, the base 20 may be the flat type base.

Since the HDD apparatus 10 of the present embodiment is a small form factor HDD (SFF HDD), the disk 22 has a diameter of 1.8 inch. However, the present invention is not limited thereto but may be applied to a SFF HDD including a disk (not shown) having a diameter of 1.3 inch or 0.85 inch less than 1.8 inch.

The HSA 24 includes a magnetic head 25 which records data on and/or reproduces data from the disk 22 and an actuator 26 which controls the magnetic head 25 to move or fly with respect to the disk 22 so that the magnetic head 25 accesses the data recorded on the disk 22.

The magnetic head 25 is installed at a front end of a head gimbal 29 which extends from the actuator 26. Thus, the magnetic head 25 is raised by air streams generated from surfaces of a plurality of disks when the plurality of disks rotate at high speeds. As a result, the magnetic head 25 flies keeping a minute gap from the surfaces of the disks.

The actuator 26 pivots with respect to the disk 22 on a pivot shaft 26a. In other words, when the actuator 26 moves to left and right due to an operation of a voice coil motor (VCM) 28 which is installed at an end of the actuator 26, the magnetic head 25, which is installed at an other end of the actuator 26, radially moves on the disk 22 to record data in tracks of the disk 22 or reads data from the tracks of the disk 22.

A latch (not illustrated) is provided under the VCM 28 to elastically support the actuator 26 when the magnetic head 25 is parked in a parking zone of the disk 22, in order to prevent the actuator 26 from arbitrarily moving. If an additional ramp is provided, the magnetic head 25 is parked in the ramp. In this case, the parking zone is excluded from the disk 22.

The cover 30 shields the upper surface of the base 20 to protect a plurality of parts which are embedded in the base 20. The cover 30 may be formed of a metal material. In particular, an aluminum (Al) alloy may be die-cast to form the cover 30. Alternatively, a steel material may be pressed to form the cover 30.

The PCBA 40 is combined with the lower portion of the base 20. The PCBA 40 includes a printed circuit board (PCB) 50 on which one or more circuit parts are installed and a connector 60 which is combined with a side of the PCB 50.

One or more controllers 52 are installed as the plurality of circuit parts on the PCB 50 to perform various types of controls of the HDD apparatus 10. One or more memories M are installed around the controllers 52 and connected to the controllers 52 to store various types of data or tables, etc. The PCB 50 of the PCBA 40 may include conductive lines formed thereon to electrically connect corresponding ones of the controller 52, the memory M, one or more terminals 81, and/or the circuit parts.

Figure 2:
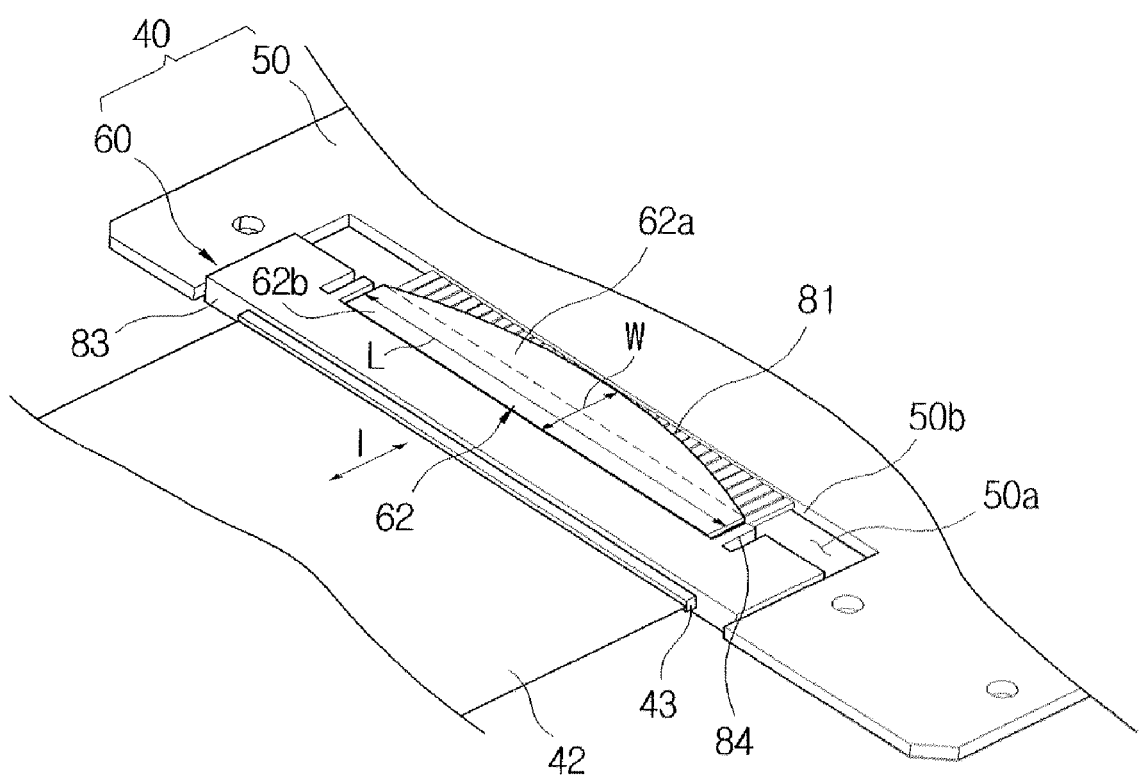
FIG. 2 is an enlarged view illustrating a connector of the HDD apparatus of FIG. 1.
Figure 3:
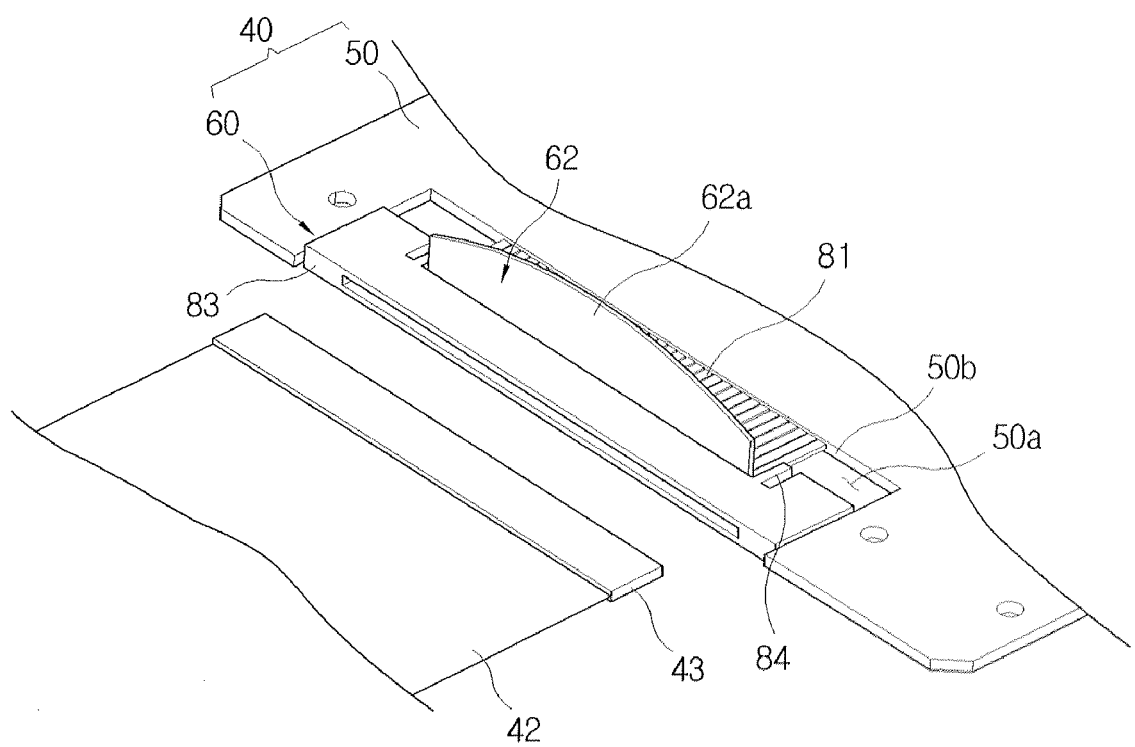
FIG. 3 is an exploded perspective view illustrating the connector and a connection terminal of a flexible printed cable (FPC) of FIG. 2.
Figure 4:
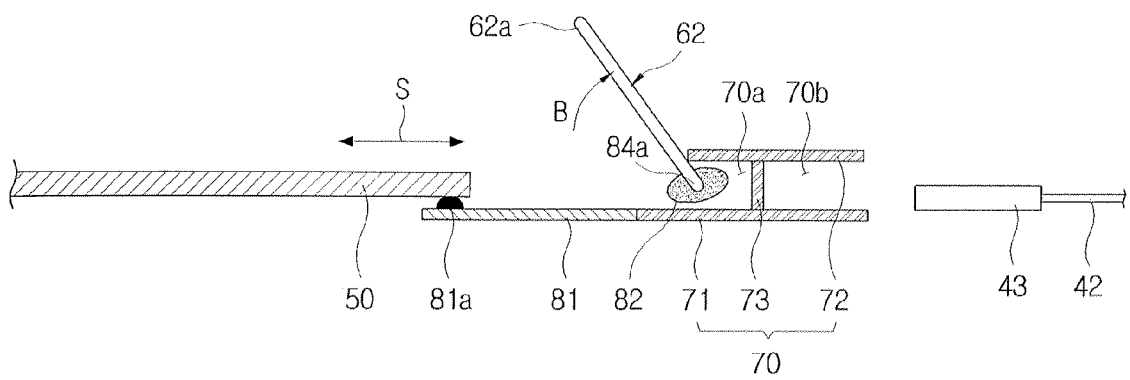
FIGS. 4 and 5 are respectively cross-sectional views schematically illustrating processes of unlocking the connection terminal from and locking the connection terminal to the connector.
Figure 5:
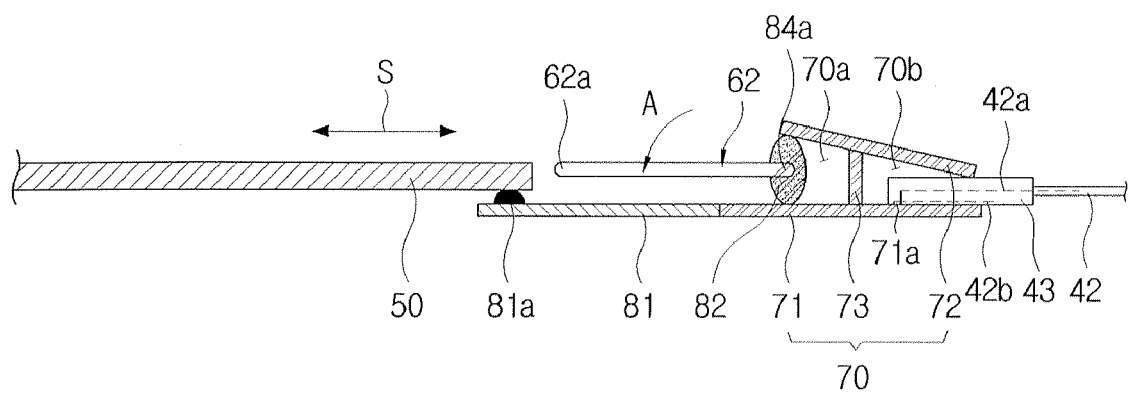

FIG. 2 is an enlarged view illustrating the connector 60 of FIG. 1, and FIG. 3 is an exploded perspective view illustrating the connector 60 and a connection terminal 43 of a flexible printed cable (FPC) 42 of FIG. 2. FIGS. 4 and 5 are respectively cross-sectional views schematically illustrating processes of unlocking the connection terminal 43 from and locking the connection terminal to the connector 60.

Referring to FIGS. 2 through 5, the connection terminal 43 of the FPC 42 is attachably or detachably combined with the connector 60 which is combined with the side of the PCB 50. Here, the FPC 42 is connected to a main board of an electronic product.

The connector 60 may be manufactured separately from the PCB 50 and then combined with the side of the PCB 50.

A flip 62 is combined with the connector 60. As will be described in more detail later, the flip 62 pivots on a side of the connector 60. When the connection terminal 43 of the FPC 42 is inserted into the connector 60, the flip 62 pivots in a direction A of FIG. 5 to be disposed in a surface direction of the PCB 50, in order to lock the connection terminal 43 of the FPC 42 into the connector 60 as illustrated in FIGS. 2 and 5.

The flip 62 pivots in a direction B of FIG. 4 to be disposed in a direction perpendicular to the PCB 50, so as to unlock the connection terminal 43 of the FPC 42 from the connector 60.

As described above, a locking operation is referred to as a mechanical fixation of the connection terminal 43 of the FPC 42 to the connector 60 and an electrical connection of the connection terminal 43 of the FPC 42 to the connector 60 to transmit data between the HDD apparatus and an external apparatus through the FPC 42 and connector 60.

Since the flip 62 has the above-described structure, the flip 62 locks the connection terminal 43 of the FPC 42 into and unlocks the connection terminal 43 from the connector 60. The flip 62 may have a rectangular shape so that a length L of the flip 62 is relatively longer than a width W of the flip 62. The length L is disposed in a direction perpendicular to an insertion direction I when the FPC is inserted into the connector 60.

Although the flip 62 may have the rectangular shape as described above, the flip 62 smoothly operates. As described above, the length of the flip 62 of the SFF HDD having a diameter of 1.8 inch or less is within a range between 10 mm and 20 mm, the width of the flip 62 is 2 mm or less, and a thickness of the flip 62 is tens of millimeters or less. Thus, the convenience of pivoting operations of the flip 62 for locking and unlocking may be reduced, thereby lowering efficiency in a handling work of the flip 62. In addition, the flip 62 may be easily broken down by an external force applied thereto.

Therefore, in the present embodiment, the flip 62 may include an area increasing and strength reinforcing portion 62a formed thereon to improve the handling work and mechanical strength of the flip 62. The area increasing and strength reinforcing portion 62a increases a handling area of the flip 62 and reinforces strength of the flip 62.

It is possible that the flip 62 may include a first portion 62b and a second portion 62a, as the area increasing and strength reinforcing portion 62a, extended from the first portion 62b to have a length L and a width W varying along a lengthwise direction of the flip 62. Accordingly, the flip 62 may vary in length L and width W. It is also possible that the flip 62 may have a uniform thickness. However, it is also possible that the flip 62 may vary in thickness according to a distance from a rotating or pivoting axis of the flip 62. At least one of the first portion and the second portion may vary in length L, the width W, and/or thickness.

As illustrated in FIG. 2, the area increasing and strength reinforcing portion 62a is formed at an exposed end of the flip 62. In other words, in the present embodiment, the area increasing and strength reinforcing portion 62a and the flip 62 form a single body using a single material.

The single material may be a synthetic resin such as plastic. Here, plastic having high strength may be more effective.

Referring to FIG. 2, a dotted line is marked at the flip 62 only to indicate a position of the area increasing and strength reinforcing portion 62a. Thus, this dotted line is not marked in a real product.

The flip 62 of the present embodiment may have a relatively larger area than a conventional flip due to the area increasing and strength reinforcing portion 62a formed at the exposed end of the flip 62. Therefore, the handling work of the flip 62 is improved. Also, the flip 62 may have higher strength than the conventional flip and thus may not be broken down by frequent operations of the flip 62.

Therefore, the area increasing and strength reinforcing portion 62a may be formed at any exposed end of the flip 62 in any shape. However, it is possible that a central area of a conventional flip is weak in terms of structure and thus frequently broken down. Thus, a width W of the area increasing and strength reinforcing portion 62a of the present embodiment is increased from both ends toward a central area.

Accordingly, the area increasing and strength reinforcing portion 62a of the present embodiment has an arc or round shape to increase a width W of the central area so as to complement a portion which is weak to a bending force applied thereto. However, the area increasing and strength reinforcing portion 62a is not necessarily limited to this shape.

In the present embodiment, the area increasing and strength reinforcing portion 62a having the arc shape is further formed at the flip 62. Thus, as illustrated in FIG. 3, a space is formed in the PCB 50 by the area increasing and strength reinforcing portion 62a increased at the flip 62 in order to allow the pivoting operation of the flip 62 illustrated with reference to FIG. 2.

For this purpose, a spacer 50b is further formed in the PCB 50 to be adjacent to the connector 60 so as to allow the flip 62 to pivot.

The spacer 50b means the above-described space. In the present embodiment, a side of the PCB 50 is cut to form the spacer 50b. In other words, a portion of the PCB 50 adjacent to the connector 60 is cut backward by a predetermined length to form the spacer 50b. Thus, the flip 62 is not restrained in FIG. 3 when the flip 62 pivots as shown in FIG. 2.

In the present embodiment, the flip 62 including the area increasing and strength reinforcing portion 62a is applied to increase the convenience of the pivoting operations of the flip 62 for locking and unlocking so as to improve the handling work of the flip 62. Also, the flip 62 is given the mechanical strength to sufficiently endure the applied external force so as to be prevented from being easily broken down.

A structure of the connector 60, which is connected to the flip 62 to lock and unlock the connection terminal 43 of the PCB 42 when the flip 62 pivots, will now be described in brief.

The connector 60 includes a plurality of sockets 70, a plurality of terminals 81, a locker 82, and a socket housing 83. The plurality of pockets 70 include a first space 70a to receive the locker 82, and a second space as terminal insertion portions 70b to receive the connection terminal 43 of the FPC 42 which is inserted thereto. The plurality of terminals 81 electrically connect the plurality of sockets 70 to the PCB 50. The locker 82 is connected to the flip 62, operates when the flip 62 pivots, and locks the connection terminal 43 of the FPC 42, which is inserted into the terminal insertion portions 70b, into the sockets 70. The socket housing 83 is partially combined with the PCB 50 and encloses and supports the plurality of sockets 70.

As illustrated in FIGS. 4 and 5, the sockets 70 include lower plates 71, upper plates 72, and barrier plates 73. The lower plates 71 are electrically connected to the terminals 81. The upper plates 72 keep predetermined distances above the lower plates 71 to be parallel with the lower plates 71. The barrier plates 73 are perpendicular to the lower and upper plates 71 and 72 between the lower and upper plates 71 and 72 so as to divide areas between the lower and upper plates 71 and 72 into first and second spaces 70a and 70b.

Since the sockets 70 include the lower and upper plates 71 and 72 and the barrier plates 73 as described above, the sockets 70 have structures in which letters "H" are arranged widthwise. In FIGS. 4 and 5, thicknesses of the lower and upper plates 71 and 72 and the barrier plates 73 are exaggerated for clarity. However, the lower and upper plates 71 and 72 and the barrier plates 73 substantially have very minute thicknesses and are formed of a conductive metal thin film. Thus, the lower and upper plates 71 and 72 and the barrier plates 73 have elasticity to be easily bent. The first spaces 70a of the sockets 70 are adjacent to the PCB 50 due to the lower and upper plates 71 and 72 and the barrier plates 73 and house the locker 82. The second spaces 70b are used as the terminal insertion portions 70b into which the connection terminal 43 of the FPC 42 is inserted.

The plurality of terminals 81 are soldered onto the PCB 50 using corresponding soldering portion 81a. As illustrated in FIG. 5, when the FPC 42 is placed in the socket 70, one or more end portions 42b of one or more conductive lines 42a of the FPC 42 are disposed to contact corresponding conductive circuits 71a of the lower plate 71, and the conductive circuits 71a of the socket 70 are electrically connected to the corresponding conductive lines of the PCB 50 through the corresponding terminals 81 and soldering portions 81a.

In the present embodiment, the locker 82 housed in the first spaces 70a operates as a rotating cam. The rotating cam rotates when the flip 62 pivots in the direction A of FIG. 5 to be parallel with the upper plates 72, to elastically deform the upper plates 72 so that the upper plates 72 slants. As a result, the connection terminal 43 of the FPC 42, which is inserted into the terminal insertion portions 70b, is clamped by the lower and upper plates 71 and 72.

As illustrated in FIGS. 4 and 5, the locker 82 may be a rotating cam having a rotating body which has an elliptic shape with different long and short radii with respect to a rotating axis 84a. If the locker 82 rotates with respect to a rotating shaft axis 84a such that the long shaft of the rotating cam 82 is positioned between the lower and upper plates 71 and 72 due to pivoting of the flip 62 as illustrated in FIG. 5, the upper plates 72 are elastically deformed so that sides of the upper plates 72, i.e., the first spaces 70a, are raised and other sides of the upper plates 72, i.e., the second spaces 70b, are lowered. The connection terminal 43 of the FPC 42 may be clamped and locked by the lower and upper plates 71 and 72 based on the elastic deformations of the upper plates 72.

Referring to FIGS. 2 and 3, a pair of pivot supporting brackets 84 are formed at opposite ends of the socket housing 83 to be disposed next to both ends of the flip 62 so as to support the flip 62 so that the flip 62 pivots. The flip 62 is hinged on the pivot supporting brackets 84 to pivot in a corresponding position.

A method of connecting the connection terminal 43 of the FPC 42, which is connected to a main board of an electronic apparatus, to the connector 60 of the HDD 10 having the above-described structure will now be described.

When the connection terminal 43 of the FPC 42 separates from the connector 60 as illustrated in FIGS. 3 and 4, the connection terminal 43 of the FPC 42 is inserted into the terminal insertion portions 70b of the connector 60. In this state, the flip 62 pivots in the direction B of FIG. 4.

Next, the flip 62 pivots in the direction A of FIG. 5. The flip 62 pivots on the pair of pivot supporting brackets 84 in the direction A of FIG. 5 to rotate the rotating cam 82.

In other words, when the flip 62 pivots in the direction A of FIG. 5, the long shaft of the rotating cam 82 is positioned between the lower and upper plates 71 and 72. In this case, the upper plates 72 are elastically deformed so that the sides of the upper plates 72 are raised, and the other ends of the upper plates 72 are lowered. Therefore, the connection terminal 43 of the FPC 42 is clamped and locked by the lower and upper plates 71 and 72 based on the elastic deformations of the upper plates 72.

The locking process is achieved based on the pivoting operation of the flip 62. In the present embodiment, the area increasing and strength reinforcing portion 62a is formed at the flip 62. Thus, the convenience of the pivoting operations of the flip 62 for locking and unlocking is increased to improve the handling work of the flip 62.

In addition, the flip 62 is given the mechanical strength to sufficiently endure the applied external force due to the area increasing and strength reinforcing portion 62a. Thus, the flip 62 is prevented from being easily broken down.

As illustrated in FIG. 5, when the FPC 42 is placed in the socket 70, one or more end portions 42b of one or more conductive lines 42a of the FPC 42 are disposed to contact corresponding conductive circuits 71a of the lower plate 71, and the conductive circuits 71a of the socket 70 are electrically connected to the corresponding conductive lines of the PCB 50 through the corresponding terminals 81.

Figure 6:
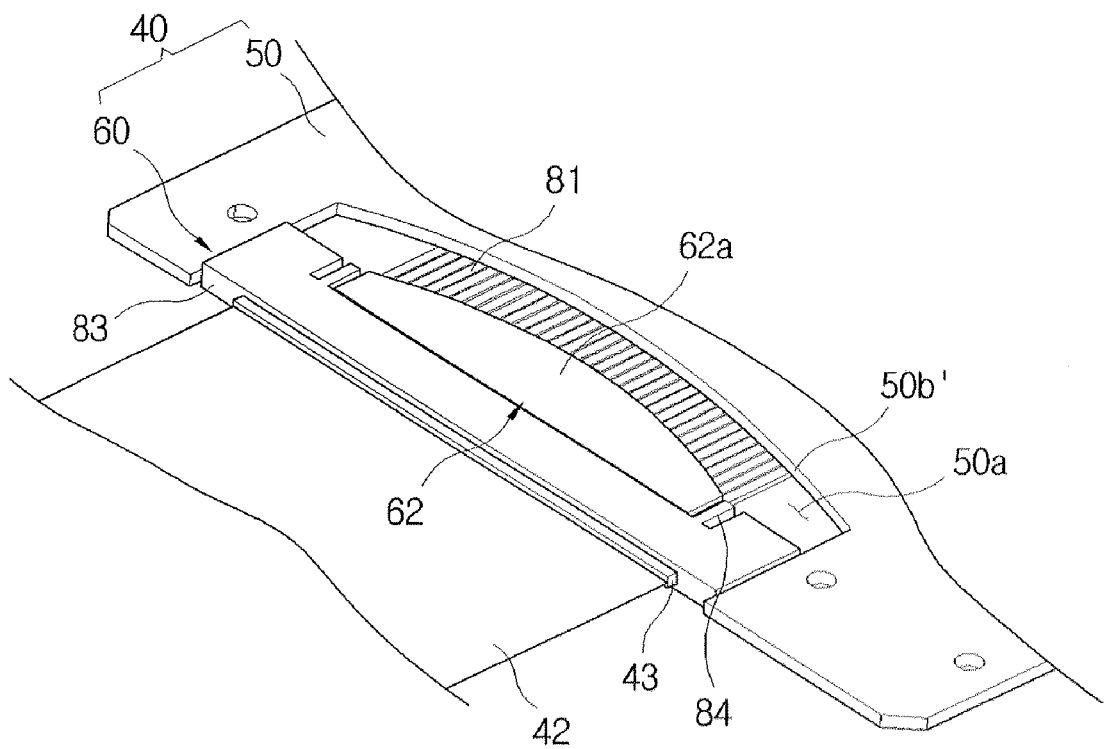
FIG. 6 is an enlarged view illustrating a connector of an HDD apparatus according to another embodiment of the present general inventive concept.

FIG. 6 is an enlarged view illustrating a connector of an HDD apparatus according to another embodiment of the present general inventive concept.

In the previous embodiment, an outer line of the portion of the PCB 50 cut to form the spacer 50b is a straight line. However, as shown in FIG. 6, an outer line of a cut portion 50b' may have an arc or round shape corresponding to an outer line of an area increasing and strength reinforcing portion 62a.

Figure 7:
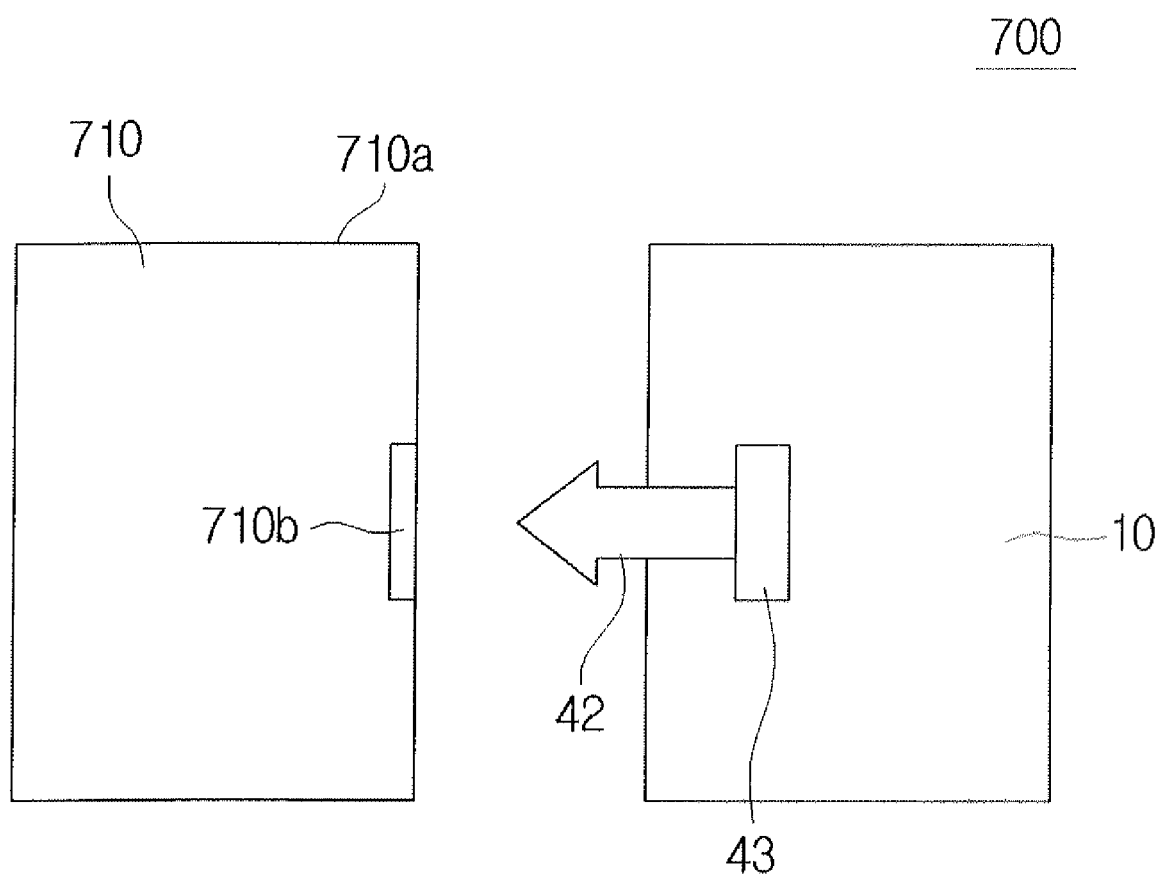
FIGS. 7 and 8 are views illustrating an apparatus having a hard disk drive apparatus according to an embodiment of the present general inventive concept.

FIG. 7 is a view illustrating an apparatus 700 having a hard disk drive apparatus according to an embodiment of the present general inventive concept. The apparatus 700 may include a data processing device 700 having a main body 710 and a terminal 710a formed on the main body 710 to be connected to a flexible printed cable (PFC) 42 and a connection terminal 43 of a memory device. The hard disk drive (HDD) apparatus 10 of FIGS. 1 through 6 can be used as the memory device to store data thereon and to output the data therefrom. The data processing device 710 may be a device to write data in the HDD apparatus and to process data received from the HDD apparatus, a computer to write data in the HDD apparatus and to receive data from the HDD apparatus, etc.

Figure 8:
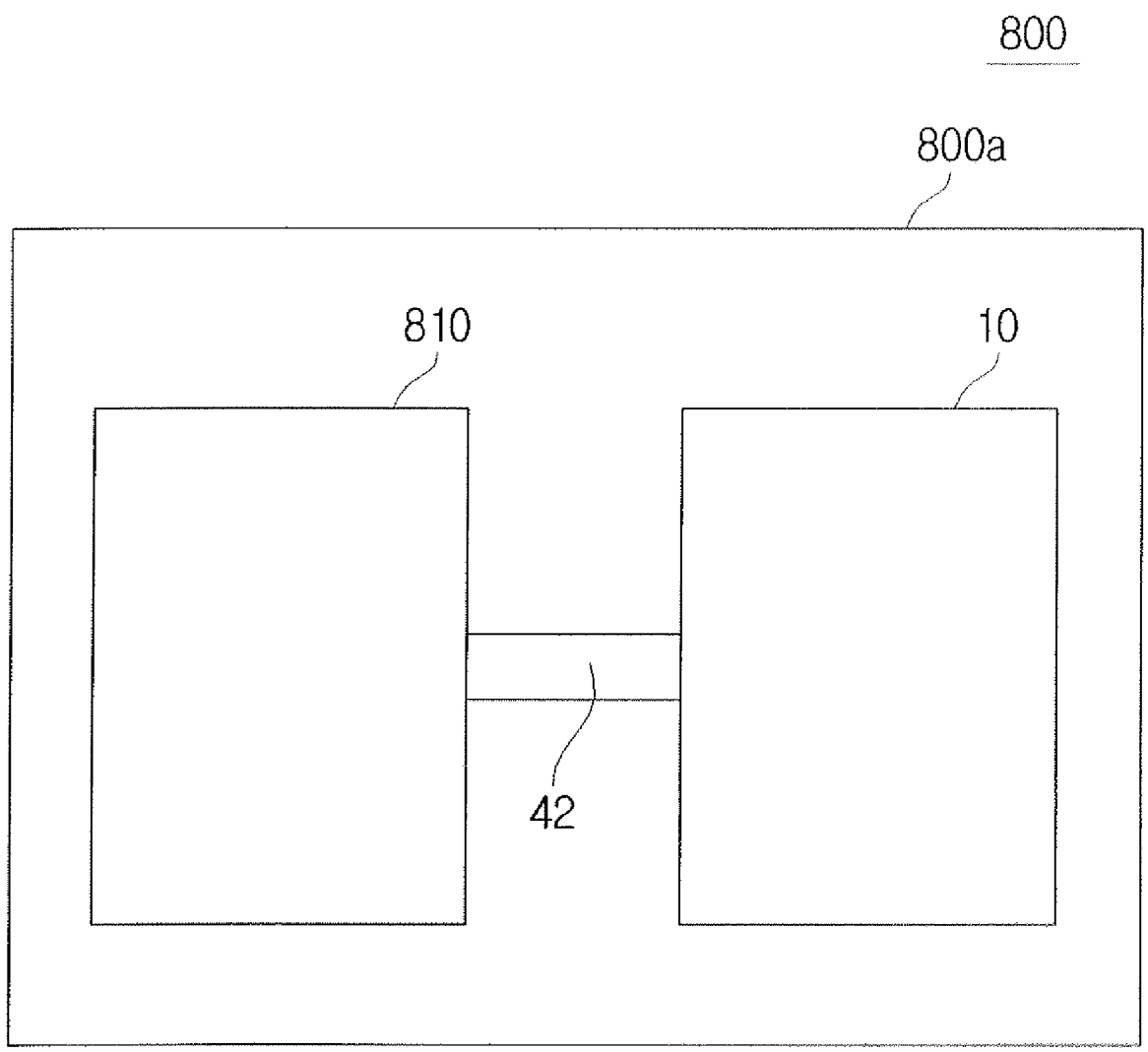

FIG. 8 is a view illustrating an apparatus 800 having a hard disk drive apparatus according to an embodiment of the present general inventive concept. The apparatus 800 includes a main body 800a, and further includes a data processing device 810 and an HDD apparatus 10 installed in the main body 800a and connected to each other using the FPC 42. The apparatus may be a device to write data in the HDD apparatus and to process data received from the HDD apparatus, a camcorder to receive an image and to store the received image in the HDD apparatus, a computer to write data in the HDD apparatus and to receive data from the HDD apparatus, etc. The apparatus may further include one or more terminals or communication units to communicate with an external apparatus to receive and transmit data.

As described above, in am HDD according to the present general inventive concept, pivoting operations of a flip for locking and unlocking is improved, convenience of operations of the flip is increased, and a handling work of the flip is easily performed. Also, the flip is provided with mechanical strength to sufficiently endure an applied external force such that the flip is prevented from being easily broken down.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A hard disk drive (HDD) apparatus comprising:
   a connector to be combined with a side of a printed circuit board (PCB) and with a connection terminal of a flexible printed cable (FPC);
   a flip to be pivotably combined with the connector to lock the connection terminal into and unlock the connection terminal from the connector; and
   an area increasing and strength reinforcing portion formed at the flip to increase a handling area of the flip and reinforce strength of the flip,
   wherein the connector comprises:
   a plurality of sockets comprising terminal insertion portions into which the connection terminal is inserted, wherein the sockets are formed at a side of the connector;
   a locker connected to the flip and operating when the flip pivots, to lock the connection terminal, which is inserted into the terminal insertion portions, into the sockets; and
   a socket housing which is partially combined with the PCB and encloses and supports the plurality of sockets,
   wherein the PCB further comprises a spacer which is adjacent to the connector to allow the flip to pivot, and
   wherein a side of the PCB is cut to form the spacer.

2. The HDD of claim 1, wherein the area increasing and strength reinforcing portion is formed at an exposed end of the flip.

3. The HDD of claim 1, wherein the area increasing and strength reinforcing portion and the flip form a single body using a single material.

4. The HDD of claim 1, wherein the flip has a rectangular shape so that a length is longer than a width, and the area increasing and strength reinforcing portion has a width which is gradually increased from both ends toward a central area.

5. The HDD of claim 4, wherein the area increasing and strength reinforcing portion has an arc shape.

6. The HDD of claim 1, wherein the connector further comprises a plurality of terminals which electrically connect the plurality of sockets to the PCB.

7. The HDD of claim 1, wherein a plurality of terminals are soldered onto the PCB.

8. The HDD of claim 1, wherein the plurality of sockets comprises:
   lower plates electrically connected to the terminals;
   upper plates keeping predetermined distances above the lower plates to be parallel with the lower plates; and
   barrier plates perpendicular to the lower and upper plates between the lower and upper plates to divide areas between the lower and upper plates into first and second spaces.

9. The HDD of claim 8, wherein the first spaces are adjacent to the PCB and house the locker, and the second spaces are the terminal insertion portions.

10. The HDD of claim 9, wherein the locker housed in the first spaces is a rotating cam which rotates when the flip pivots together with the upper plates, to elastically deform the upper plates so that the upper plates slant so as to clamp the connection terminal, which is inserted into the terminal insertion portions, by the lower and upper plates.

11. The HDD of claim 1, wherein the socket housing further comprises a pair of pivot supporting brackets which are formed just next to both ends of the flip to support the flip so that the flip pivots.

12. The HDD of claim 1, wherein an outer line of the cut side of the PCB has a shape corresponding to an outer line of the area increasing and strength reinforcing portion.

13. The HDD of claim 1, wherein the HDD is a small form factor HDD (SFF HDD) having a diameter of 1.8 inch or less.

14. An apparatus comprising:
a processing unit to process data; and
a hard disk drive apparatus including a connector combined with a side of a printed circuit board (PCB) and with a connection terminal of a flexible printed cable (FPC) connectable to the processing unit, a flip pivotably combined with the connector to lock the connection terminal into and unlock the connection terminal from the connector, and an area increasing and strength reinforcing portion formed at the flip to increase a handling area of the flip and reinforce strength of the flip,
wherein the connector comprises:
a plurality of sockets comprising terminal insertion portions into which the connection terminal is inserted, wherein the sockets are formed at a side of the connector;
a locker connected to the flip and operating when the flip pivots, to lock the connection terminal, which is inserted into the terminal insertion portions, into the sockets; and
a socket housing which is partially combined with the PCB and encloses and supports the plurality of sockets,
wherein the PCB further comprises a spacer which is adjacent to the connector to allow the flip to pivot, and
wherein a side of the PCB is cut to form the spacer.

15. An apparatus comprising:
a processing unit to process data; and
a hard disk drive apparatus including a connector combined with a side of a printed circuit board (PCB) and with a connection terminal of a flexible printed cable (FPC) connectable to the processing unit, a flip pivotably combined with the connector to lock the connection terminal into and unlock the connection terminal from the connector, and a portion formed on the flip and having a variable length, a variable width, and a variable thickness,
wherein the connector comprises:
a plurality of sockets comprising terminal insertion portions into which the connection terminal is inserted, wherein the sockets are formed at a side of the connector;
a locker connected to the flip and operating when the flip pivots, to lock the connection terminal, which is inserted into the terminal insertion portions, into the sockets; and
a plurality of terminals which electrically connect the plurality of sockets to the PCB,
wherein the plurality of sockets comprises:
lower plates electrically connected to the terminals;
upper plates keeping predetermined distances above the lower plates to be parallel with the lower plates; and
barrier plates perpendicular to the lower and upper plates between the lower and upper plates to divide areas between the lower and upper plates into first and second spaces,
wherein the first spaces are adjacent to the PCB and house the locker, and the second spaces are the terminal insertion portions,
wherein the locker housed in the first spaces is a rotating cam which rotates when the flip pivots together with the upper plates, to elastically deform the upper plates so that the upper plates slant so as to clamp the connection terminal, which is inserted into the terminal insertion portions, by the lower and upper plates.

* * * * *